United States Patent Office 3,667,908
Patented June 6, 1972

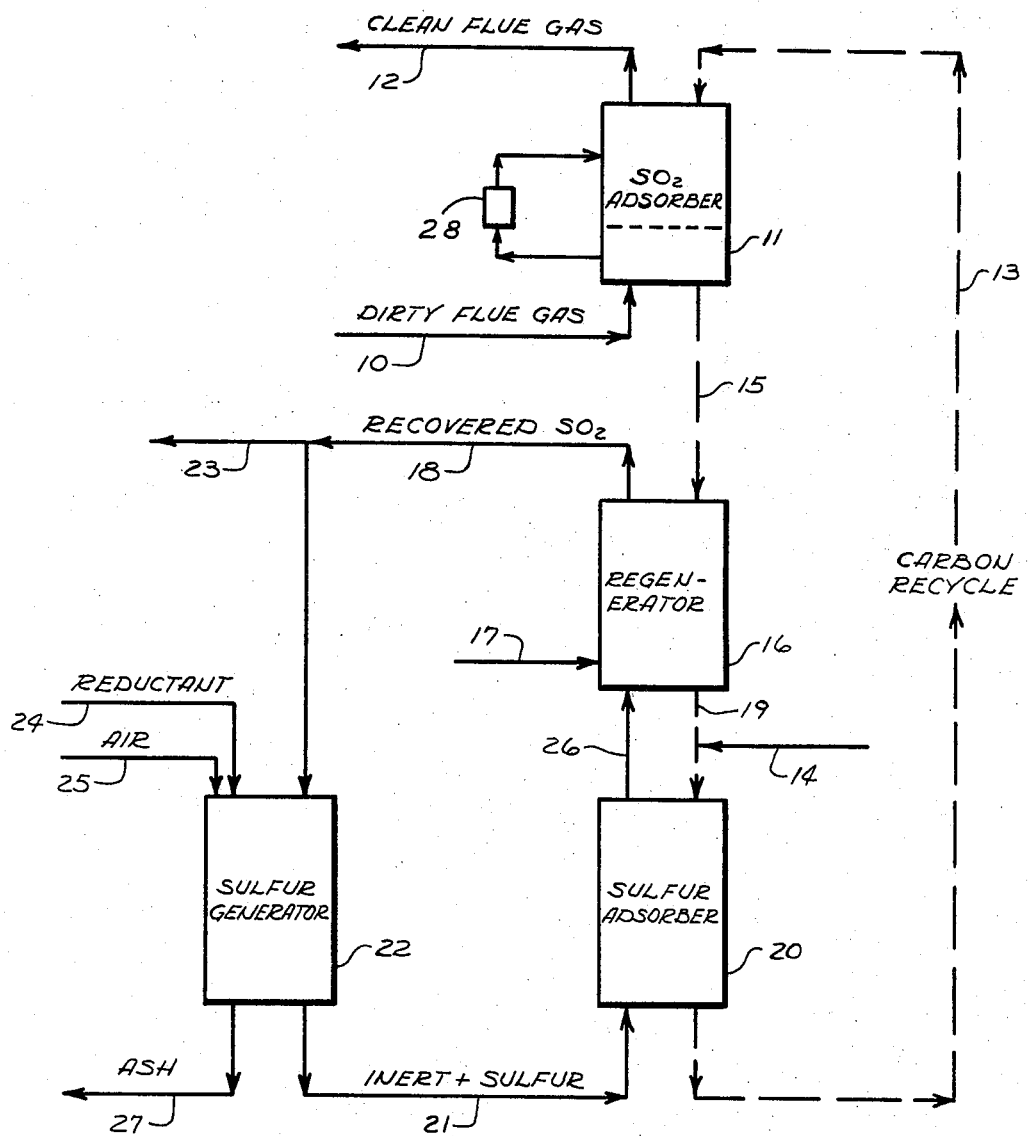

3,667,908
REMOVAL AND RECOVERY OF SULFUR
OXIDES FROM GASES
Samuel L. Torrence, Charleston, S.C., assignor to
Westvaco Corporation, New York, N.Y.
Continuation of abandoned application Ser. No. 724,777,
Apr. 29, 1968. This application Nov. 27, 1970, Ser.
No. 93,485
Int. Cl. C01b 17/60
U.S. Cl. 23—178                           3 Claims

ABSTRACT OF THE DISCLOSURE

A process for removing sulfur dioxide and sulfur trioxide from a gaseous stream whereby sulfur dioxide is oxidized to sulfur trioxide and the sulfur trioxide is adsorbed onto an activated carbon adsorbent having elemental sulfur adsorbed thereon; thereafter the adsorbent is regenerated producing sulfur dioxide and activated carbon adsorbent with a minimal loss of adsorbent due to burn-off; elemental sulfur is adsorbed onto the regenerated adsorbent and the adsorbent is then recycled to contact the gaseous stream and the sulfur dioxide produced during regeneration is recovered.

---

This application is a continuation of my copending application Ser. No. 724,777 filed Apr. 29, 1968 and now abandoned.

This invention relates to a process for removing sulfur oxides from gas streams by adsorption onto a carbonaceous adsorbent. More specifically, this invention relates to removal of sulfur dioxide and sulfur trioxide from flue gases by oxidizing the sulfur dioxide to sulfur trioxide and adsorbing sulfur trioxide onto an activated carbon adsorbent having elemental sulfur adsorbed thereon. The adsorbent is then regenerated for reuse and the sulfur dioxide recovered from regeneration is then further processed.

Many industrial plants use sulfur-containing fuels such as coal and fuel oil which when burned form, among other non-desirable products, sulfur dioxide and sulfur trioxide. The removal of these sulfur oxides from flue gases has long been a problem. The presence of sulfur oxides in waste gases passed to the atmosphere results in considerable amounts of pollution. The term sulfur oxides is meant to include sulfur dioxide and sulfur trioxide. Although several processes have been developed to remove these sulfur oxides from flue gases, none of these processes have been able to remove the sulfur oxides economically. One of the difficulties in developing an economical system is that the volume of gas from which sulfur oxides are to be removed is generally so great that the sulfur oxide concentrations are in the order of 0.1 to 5% by volume. Recent emphasis in sulfur oxide recovery from flue gases has centered upon processes which produce a salable by-product and which operate near stack temperatures, i.e., near the temperature of flue gas as it comes from the plant to the outlet stack, because the stack temperature enables the flue gas to retain its buoyancy. Retention of buoyancy prevents flue gas from settling in areas nearby the outlet stack, thereby preventing pollution problems in the immediate vicinity.

One process for removal of sulfur oxides from a gaseous stream by adsorption onto a carbonaceous adsorbent has been set forth in U.S. Pat. 2,992,065. In this process sulfur dioxide is oxidized to sulfur trioxide and then adsorbed as sulfuric acid onto an activated char adsorbent. The adsorbent is removed to a regenerator where the temperature is raised. At the regeneration temperature, the adsorbed sulfuric acid is chemically reduced to sulfur dioxide with large amounts of the char being oxidized to carbon dioxide thereby resulting in large losses of adsorbent. One of the disadvantages of this process is that because of the large adsorbent losses, known as burn-off losses, it is necessary to use a low-cost char and to continuously supply fresh char. Another disadvantage of this process, because the low-cost char has poor adsorption characteristics, is that large amounts of char are required to adsorb the sulfur oxides. The conversion of sulfur dioxide to sulfuric acid is common to all presently used carbonaceous adsorption recovery processes. The method of regeneration generally used in most commercial processes is either washing the adsorbent with water to produce dilute sulfuric acid or thermal treatment whereby the adsorbed sulfuric acid is reduced back to sulfuric dioxide. Thermal regeneration is preferred because a stream concentrated in sulfur dioxide is produced which can be easily processed for commercial uses.

It is a general object of this invention to provide a process for adsorbing sulfur oxides from a gas stream whereby the regenerated carbonaceous adsorbent losses due to carbon burn-off are low enough to justify the use of a hard granular activated carbon. A more specific object is to provide a continuous process for removing sulfur dioxide and sulfur trioxide from flue gases whereby the oxides are adsorbed onto an activated carbon adsorbent having elemental sulfur adsorbed thereon and the carbon adsorbent is regenerated without appreciable burn-off losses. Another object is to provide an improved process for sequential removal of sulfur dioxide and sulfur trioxide from a gaseous stream, thereby permitting the gas stream to be passed to the atmosphere without fear of air pollution from sulfur oxides. A further object of this invention is to provide a sulfur oxide removal process utilizing a highly activated carbon possessing significantly higher rate and capacity characteristics than low cost char. A still further object is to provide a process for regenerating the adsorbent for reuse and adsorbing elemental sulfur onto the regenerated adsorbent.

It has now been found that by the additional step of adsorbing elemental sulfur onto a carbonaceous adsorbent, regeneration of the spent adsorbent may be accomplished with a minimal amount of carbon loss due to burn-off. Spent adsorbent is the term used to describe the condition of the adsorbent as it comes from the adsorber having adsorbed sulfuric acid thereon. It has also been found that highly activated carbons adsorb more sulfur oxides per pound of adsorbent than do activated chars and that adsorption can be accomplished at significantly lower residence times between the gas stream and the carbon adsorbent. In a preferred method of this invention activated carbon having elemental sulfur adsorbed thereon is continuously passed in a fluidized bed counter-current to a gas stream containing sulfur oxides thereby to sequentially adsorb the sulfur trioxide and sulfur dioxide and thereafter continuously regenerate and recycle the adsorbent in a closed circuit and recover sulfur dioxide from the regenerated adsorbent. Essentially all of the sulfur dioxide and sulfur trioxide may be adsorbed before the gas stream is exhausted through the outlet stack into the atmosphere. The gas stream as it passes to the atmosphere may be reduced to less than 5 p.p.m. sulfur dioxide and sulfur trioxide.

Activated carbon physically adsorbs little sulfur dioxide near flue gas temperatures and removal depends upon the carbon acting as a catalyst in the conversion of sulfur dioxide to sulfur trioxide and then hydrolyzing the sulfur trioxide to sulfuric acid which is adsorbed on the carbon.

1] 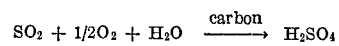

The oxygen and water vapor necessary for reaction are present in the flue gas. Flue gas containing sulfur dioxide may be passed at a temperature below 350° F. in contact with a carbonaceous adsorbent having elemental sulfur adsorbed thereon to carry out the above reaction. At adsorption temperatures above 350° F. sulfur on the adsorbent begins to react with oxygen in the gas stream. The preferable sulfur dioxide adsorption temperature is between 200° F. and 260° F.

The use of coal-base activated carbons show significantly higher rate and capacity characteristics for sulfur dioxide recovery compared to other commercial carbons and chars tested, whether using a fixed or moving bed. For example, one carbon tested, recovered 21–22 grams sulfur dioxide per 100 grams carbon to 20% breakthrough at 203° F. and a space velocity of 2000 hr.$^{-1}$. A recovery process employing low cost char recovers 10 grams sulfur dioxide per 100 grams char and in order to recover 90% of the sulfur dioxide and sulfur trioxide from a gas stream in a continuously moving bed the space velocity was restricted to 300 vol. gas/hr./vol. char [S. Katell, "Removing Sulfur Dioxide From Flue Gases," Chemical Engineering Progress, vol. 62, No. 10, pp. 67–73 (1966)]. At these low throughputs adsorber units are large and costly. The ability to adsorb sulfur oxides at a high space velocity and to use a carbon adsorbent having a high sulfur dioxide pick-up suggest that approximately one-fifth to one-seventh the adsorber volume and one half the carbon recycle rate could be employed with coal-based carbon compared to a char. The combination of carbon burn-off, even with the low cost char, and larger adsorber units place present processes at an economic disadvantage. Although any carbonaceous adsorbent may be employed in carrying out this invention, the preferred adsorbents are highly activated carbons, particularly coal-based activated carbons.

Another embodiment of this process resides in the sequential adsorption of sulfur trioxide and sulfur dioxide from flue gas streams by using a single carbonaceous adsorbent so as to first adsorb the sulfur trioxide while it is above its dew point and then oxidize and adsorb the sulfur dioxide at a temperature below 350° F. and preferably between 200° F. and 260° F. and thereafter regenerating and recycling the carbonaceous adsorbent. Adsorbing at a temperature above the dew point of sulfur trioxide virtually eliminates sulfur trioxide from the dirty flue gas stream. It is necessary to use this embodiment of the process to remove sulfur trioxide because of the corrosive nature of this oxide when it condenses. Because there is a difference in dew point of sulfur dioxide and sulfur trioxide it is preferable to adsorb sulfur trioxide in one portion of the adsorber at temperatures above the dew point of sulfur trioxide and adsorb sulfur dioxide in another portion of the adsorber at a temperature below 350° F. The dew point of sulfur trioxide in most flue gases ranges between 250° F. and 480° F., but it is preferable to adsorb sulfur trioxide at a temperature between 300° F. and 350° F. Under conditions where the dew point of sulfur trioxide is below 350° F. the adsorption of both sulfur trioxide and sulfur dioxide may easily be carried out in the same step of the process.

The method of regeneration of the adsorbent is a thermal treatment whereby the spent adsorbent is heated to a temperature sufficient to reduce the adsorbed sulfur acid to sulfur dioxide which is preferably between 350° F. and 700° F.

[2] 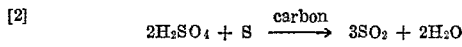

Presently used processes employing char adsorbents consume large quantities of carbon during regeneration due to burn-off according to this reaction:

[3] 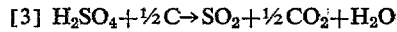

Consumption of high priced activated carbon at the rate needed for thermal regeneration according to reaction [3], i.e., about 0.1 pound of carbon per pound of sulfur dioxide recovered, is prohibitive. In the present invention sulfur replaces carbon in the reduction of sulfur dioxide during regeneration. Results indicate that carbon losses are essentially eliminated, lower than 5 moles per 100 moles sulfuric acid, or less than 10% of the burn-off from presently available commercial processes.

Regenerated adsorbent is recycled to adsorb more sulfur dioxide and sulfur trioxide. Before being recycled the regenerated adsorbent is contacted with elemental sulfur by an appropriate means whereby elemental sulfur is adsorbed onto the regenerated adsorbent. In the preferred method, the sulfur used for regeneration is recycled within the system by reaction of a portion of the regenerated sulfur dioxide with coke. Thus considering the process as a whole, a less expensive material, coke, is burned off instead of activated carbon. There are many possible reductants which can be used, including: coal, coke, hydrogen, methane and a mixture of carbon monoxide and steam. One preferred procedure is to reduce sulfur dioxide directly to vaporous elemental sulfur using one of the above-mentioned reductants followed by physical adsorption of the vaporous elemental sulfur onto the carbonaceous adsorbent. The vaporous sulfur may be carried to the sulfur adsorber in an inert gas stream, i.e., nitrogen. At least a stoichiometric amount of elemental sulfur is adsorbed onto the carbonaceous adsorbent during each recycle, and generally an excess of sulfur is adsorbed. Since activated carbon is not consumed, a material with high sulfur dioxide recovery rates such as a coal-based activated carbon can be used in order to reduce the adsorber size.

The advantages offered by this invention include the ability to use a process whereby carbon burn-off is minimized. A second advantage is the ability to use a carbon with significantly higher adsorption rate and capacity characteristics than low cost char. Thermal regeneration has the advantage of producing a stream concentrated in sulfur dioxide which can be further processed to such commercial products as liquid sulfur dioxide, sulfuric acid, or elemental sulfur. Another advantage is that this invention may be carried out in either a fixed bed or in a continuous manner such as a fluidized bed with the preferred practice employing a fluidized bed.

The above and other objects of the present invention will become more readily apparent from the following description of the drawing, the sole figure being a schematic flow diagram of a process for carrying out the present invention.

As illustrated in the drawing a stream of dirty flue gas 10 containing sulfur dioxide is fed directly into adsorber 11 where it is contacted with a carbonaceous adsorbent having sulfur adsorbed thereon. In the adsorber 11, the dirty gas stream flows countercurrent to a continuously moving mass of adsorbent 13 prior to emerging from the adsorber at 12 as clean flue gas, i.e., free from sulfur oxides. The adsorption of sulfur dioxide takes place at a temperature between 200° F. to 260° F.; therefore the buoyancy of the clean gas stream is not adversely affected and as the clean gas leaves the adsorber it will readily diffuse in the atmosphere. The spent adsorbent continuously passes out of the adsorber at 15 and into a regenerator 16. In the regenerator 16 the temperature of the spent adsorbent containing elemental sulfur is raised a sufficient amount by heater 17 so that the resultant reaction reduces the adsorbed sulfuric acid to sulfur dioxide according to reaction [2] thereby regenerating the adsorbent. The heating takes place preferably by direct heat exchange with the inert gas stream 26. The regenerated adsorbent is then removed from the regenerator at 19 and passed to a sulfur adsorber 20. Any make-up carbon lost due to burn-off and attrition is added at 14. The carbonaceous adsorbent is then contacted with vaporous elemental sulfur carried in inert gas stream 21 thereby to adsorb elemental sulfur onto the regenerated adsorbent. The carbonaceous adsorbent having sulfur adsorbed thereon is continuously recycled at 13 to the adsorber 11. The sulfur dioxide formed during the regeneration of the spent adsorbent is recovered from the adsorbent and is carried from the regenerator at 18 by inert gas stream 26. The sulfur dioxide-inert gas stream 18 is fed into sulfur generator 22 where it is either reduced to elemental sulfur for sale or preferably a portion of the elemental sulfur in vapor form is passed in an inert gas stream through line 21 to the sulfur adsorber 20. If it is not desired to reduce all of the sulfur dioxide to elemental sulfur then a portion of the sulfur dioxide stream 18 is fed through line 23 to further processing such as a sulfuric acid plant. A reductant is fed into the sulfur generator at 24 and sufficient air is fed at 25. After reduction of sulfur dioxide the ash is removed at 27.

In a modified embodiment of this process sulfur trioxide and sulfur dioxide are sequentially removed from a flue gas stream. The process is similar to that described above, but the adsorber is divided into two portions. As the dirty gas stream 10 containing both sulfur trioxide and sulfur dioxide is fed into one portion of adsorber 11 at a temperature above the dew point of sulfur trioxide, sulfur trioxide is immediately adsorbed. The gas stream containing sulfur dioxide is fed through cooler 28 to bring the temperature between 200° F. and 260° F. and is then fed back into another section of adsorber 11 for adsorption of the sulfur dioxide.

The practice of this invention may clearly be seen in the following examples.

EXAMPLE 1

Sulfur dioxide removal from various commercially available carbonaceous adsorbents was carried out in the laboratory in a one-inch diameter cylindrical adsorber charged with 100 cc. of carbonaceous adsorbent to determine the carbon having the best adsorbing and regenerating characteristics. The removal was made from a gas stream of the following composition:

| Component— | Percent by volume |
|---|---|
| $SO_2$ | 0.3 |
| $O_2$ | 3.4 |
| $H_2O$ | 6.9 |
| $CO_2$ | 11.6 |
| $N_2$ | 77.8 |

The gas stream containing sulfur dioxide was passed downward through the fixed carbon bed at a temperature of 203° F. at a superficial linear velocity of 0.5 ft./sec. and a space velocity of 2,000 vol. gas/hr./vol. C (at 32° F. and atm.). The residence time of the gas stream in contact with the adsorbent was approximately ½ second. All of the non coal-based carbons broke through immediately at a space velocity of 2000 hr.$^{-1}$.

Sulfur dioxide concentrations in the influence and effluent from the bed were determined with a gas chromatograph. The table below shows the ability of the various carbonaceous adsorbents tested to pick-up sulfur dioxide from a gas stream.

| Base | $SO_2$ recovery, g. $SO_2$/100 g. C, 20% breakthrough | Nitrogen B.E.T. surface area, m.²/gm. |
|---|---|---|
| Coal-based | 22.7 | 1,009 |
| Do | 20.7 | 648 |
| Do | 13.8 | 704 |
| Do | 9.6 | 966 |
| Do | 7.4 | 1,102 |
| Lignite | 0 | 640 |
| Coconut-based | 0 | 1,050 |
| Carbon impregnated with 1% iron oxide | 0 | 802 |
| Carbon impregnated with 0.5% palladium | 0 | 295 |
| Petroleum coke | 0 | 1,072 |
| Do | 0 | 1,119 |
| Wood (char) | 0 | 825 |
| Do | 0 | 570 |
| Lignite | 0 | 320 |

The results revealed that the best coal-based carbon removed 21-22 grams of sulfur dioxide per 100 grams of carbon. Note that the sulfur dioxide recovery rates with coal-based carbons are far superior to other materials tested.

EXAMPLE 2

Spent coal-based adsorbents having elemental sulfur adsorbed thereon were regenerated in a bed having a 1½" diameter bed with a 60 mesh screen to support the adsorbents. The procedure used was to place the spent adsorbent in the bed and purge for 1-2 hours with helium to expel air. The spent adsorbents were thermally regenerated at 500–700° F. in an inert purge. Off gases were analyzed for $SO_2$, $CO_2$ and CO with gas chromatograph with a thermal conductivity detector. The quantities of CO and $CO_2$ were used to determine the amount of burn-off. The only sulfur compound that could be detected in the off gases from the regenerator was sulfur dioxide.

In the presently available carbon adsorbent processes employing thermal regeneration the chemical reduction of adsorbed sulfuric acid to sulfur dioxide consumes the carbon adsorbent at a rate of 50 moles per 100 moles of sulfuric acid decomposed according to reaction [3]. The results in the table below indicate that significant reductions in burn-off occur where sulfur is adsorbed on the carbon adsorbent prior to sulfur dioxide recovery since the regeneration now occurs by reaction [2].

| Sample | Elemental sulfur content, g. S/100 g. C | Sulfur dioxide content, g. $SO_2$/100 g. C | Percent excess elemental sulfur | Carbon burn-off, moles/100 moles $H_2SO_4$ |
|---|---|---|---|---|
| 1 | 10.4 | 9.5 | 330 | 1 |
| 2 | 7.2 | 10.4 | 175 | 2 |
| 3 | 4.8 | 11.0 | 73 | 6 |
| 4 | 4.2 | 10.6 | 58 | 8 |
| 5 | 3.6 | 12.2 | 19 | 5 |
| 6 | 2.8 | 10.4 | 8 | 11 |
| 7 | 2.0 | 13.1 | −39 | 9 |

The data show that carbon burn-off was essentially eliminated with coal-based carbon containing 175–330% excess sulfur. Lower amounts of excess sulfur, 8–73%, gave burn-off of 5–11 moles carbon per 100 moles sulfuric acid or about 10–20% of that encountered using thermal regeneration with a char, i.e., .01–.02 pound of carbon per pound of sulfur dioxide recovered. Put in other terms the carbon loss at 10 moles/100 moles of adsorbed sulfuric acid is about 0.02 pound of activated carbon used per pound of sulfur dioxide recovered.

While the invention has been described and illustrated herein by references to various specific materials, procedures, and examples, it is understood that the invention is not restricted to the particular materials, combinations of materials, and procedures selected for that purpose. Numerous variations of such details can be employed, as will be appreciated by those skilled in the art.

I claim:

1. A continuous process for removing sulfur oxides from a gas stream wherein the sulfur-containing compounds in said gas stream are from the group consisting essentially of sulfur trioxide and sulfur dioxide, which comprises:

(a) continuously passing the gas stream above the dew point of sulfur trioxide into contact with an activated carbon adsorbent at a temperature below 350° F. whereby any sulfur trioxide present is hydrolyzed to sulfuric acid and adsorbed onto said activated carbon adsorbent and any sulfur dioxide present is passed to step (b), said activated carbon adsorbent having at least a stiochiometric amount of elemental sulfur adsorbed thereon from step (f), (b) passing the gas stream into contact with additional amounts of said activated carbon adsorbent at a temperature between 200° F. and 260° F. to adsorb sulfur dioxide as sulfuric acid therefrom, (c) heating said sulfuric acid and elemental sulfur containing activated carbon adsorbent to a temperature between 350° F. and 700° F. whereby all of said adsorbed sulfuric acid and elemental sulfur react to form sulfur dioxide without significant reaction of any of said activated carbon adsorbent, (d) recovering said sulfur dioxide from said activated carbon adsorbent, (e) reacting at least a portion of said recovered sulfur dioxide with coke to reduce said reacted sulfur dioxide to vaporous elemental sulfur, (f) adsorbing said vaporous elemental sulfur onto said activated carbon adsorbent subsequent to step (d), and (g) recycling said activated carbon adsorbent having elemental sulfur adsorbed thereon into contact with said gas stream.

2. The process of claim 1 wherein said activated carbon is coal-based activated carbon.

3. The process of claim 1 wherein the sulfur-containing compound is sulfur dioxide and step (a) is carried out at a temperature between 200° F. and 260° F.

References Cited

UNITED STATES PATENTS

| | | | |
|---|---|---|---|
| 1,519,470 | 12/1924 | Wilson et al. | 23—2.1 |
| 1,823,698 | 9/1931 | Nordlander | 23—178 |
| 2,992,065 | 7/1961 | Feustel et al. | 23—178 |
| 2,992,895 | 7/1961 | Feustel et al. | 23—178 |
| 3,284,158 | 11/1966 | Johswich | 23—178 |
| 3,345,125 | 10/1967 | Kruel et al. | 23—178 |
| 3,440,007 | 4/1969 | Takeuchi | 23—178 X |

FOREIGN PATENTS

| | | | |
|---|---|---|---|
| 749,940 | 1/1967 | Canada | 23—178 |

OSCAR R. VERTIZ, Primary Examiner

C. B. RODMAN, Assistant Examiner

U.S. Cl. X.R.

23—2 SQ